US009971526B1

(12) United States Patent
Wei et al.

(10) Patent No.: US 9,971,526 B1
(45) Date of Patent: May 15, 2018

(54) VOLUME-BASED KEY-VALUE STORE

(71) Applicant: Amazon Technologies, Inc., Seattle, WA (US)

(72) Inventors: Danny Wei, Seattle, WA (US); Valentin Priescu, Seattle, WA (US); Marc Stephen Olson, Bellevue, WA (US); Benjamin Arthur Hawks, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 300 days.

(21) Appl. No.: 14/754,326

(22) Filed: Jun. 29, 2015

(51) Int. Cl.
G06F 17/00 (2006.01)
G06F 3/06 (2006.01)
G06F 17/30 (2006.01)

(52) U.S. Cl.
CPC ............ G06F 3/0619 (2013.01); G06F 3/064 (2013.01); G06F 3/067 (2013.01); G06F 17/30321 (2013.01)

(58) Field of Classification Search
CPC .......... G06F 17/30321; G06F 3/00619; G06F 3/064; G06F 3/067; G06F 3/0619
USPC ........................................................ 707/744
See application file for complete search history.

(56) References Cited

U.S. PATENT DOCUMENTS

| 7,685,109 | B1* | 3/2010 | Ransil | G06F 17/30336 |
| | | | | 707/999.003 |
| 2007/0294211 | A1* | 12/2007 | Kim | G06F 17/30994 |
| 2010/0278191 | A1* | 11/2010 | Gupta | H04L 63/1458 |
| | | | | 370/419 |
| 2010/0333116 | A1* | 12/2010 | Prahlad | G06F 17/302 |
| | | | | 719/328 |
| 2011/0313973 | A1* | 12/2011 | Srivas | G06F 17/30194 |
| | | | | 707/634 |
| 2013/0007219 | A1* | 1/2013 | Sorenson | H04L 67/1095 |
| | | | | 709/219 |
| 2013/0226931 | A1* | 8/2013 | Hazel | G06F 17/30094 |
| | | | | 707/741 |
| 2013/0275656 | A1* | 10/2013 | Talagala | G06F 12/0246 |
| | | | | 711/103 |
| 2014/0289463 | A1* | 9/2014 | Carl | G06F 3/0604 |
| | | | | 711/114 |

(Continued)

OTHER PUBLICATIONS

Bayer, R., and E. McCreight, "Organization and Maintenance of Large Ordered Indices," Acta Informatica 1(3):173-189, 1972.

(Continued)

Primary Examiner — Kris E Mackes
Assistant Examiner — Thuy T Bui
(74) Attorney, Agent, or Firm — Davis Wright Tremaine LLP

(57) ABSTRACT

The current document describes a storage system that provides a storage volume with a block-data interface to one or more clients. The storage system provides a key-value store that is associated with the storage volume. The clients access the key-value store via a key-value interface that provides a number of key-value operations to read, write, list, and delete key-value records from the key-value store. In some implementations, the key-value interface provides additional key-value operations that support the use of the key-value store by more than one client at a time. An environment in which the key-value store is used by the clients to retain I/O throttling parameters is described.

17 Claims, 14 Drawing Sheets

(56) References Cited

U.S. PATENT DOCUMENTS

| | | | |
|---|---|---|---|
| 2014/0337375 A1* | 11/2014 | Yue | G06F 17/30424 707/769 |
| 2014/0379638 A1* | 12/2014 | Li | G06F 17/30575 707/610 |
| 2015/0088844 A1* | 3/2015 | Stigsen | G06F 17/30312 707/703 |
| 2016/0019279 A1* | 1/2016 | Sengupta | G06F 17/30581 707/625 |
| 2016/0110403 A1* | 4/2016 | Lomet | G06F 17/30356 707/695 |
| 2016/0203053 A1* | 7/2016 | Talagala | H04L 67/1097 714/6.12 |
| 2016/0203102 A1* | 7/2016 | Meng | G06F 17/3033 709/212 |
| 2016/0292179 A1* | 10/2016 | von Muhlen | G06F 17/30165 |
| 2016/0364173 A1* | 12/2016 | Frank | G06F 3/0647 |
| 2016/0366226 A1* | 12/2016 | Friedman | G06F 17/3033 |
| 2016/0378815 A1* | 12/2016 | Lu | G06F 17/30356 711/126 |
| 2017/0116221 A1* | 4/2017 | Srivas | G06F 17/30174 |
| 2017/0199818 A1* | 7/2017 | Lomet | G06F 12/0891 |

OTHER PUBLICATIONS

Comer, D., "The Ubiquitous B-Tree," Computing Surveys 11(2):123-137, Jun. 1979.

* cited by examiner

VOLUME-BASED KEY-VALUE STORE

BACKGROUND

Computing systems store information using a variety of storage systems. Storage systems are constructed using a variety of memory technologies including solid-state memory, disk memory, flash memory, optical storage, and magnetic tape. Many storage systems arrange storage space into one or more volumes, with an interface that presents the volume to clients as a block device. For example, many hard disks present a single volume with read and write operations that use a cylinder, head, and sector address. In some environments, a single volume is divided into one or more partitions, and each partition provides a separate amount of data storage. Some storage systems, such as network-attached storage ("NAS") systems and storage area networks ("SANs"), include an interface that can be used by more than one client, or by more than one client simultaneously.

BRIEF DESCRIPTION OF THE DRAWINGS

Various embodiments in accordance with the present disclosure will be described with reference to the drawings, in which.

DETAILED DESCRIPTION

Figure 1:
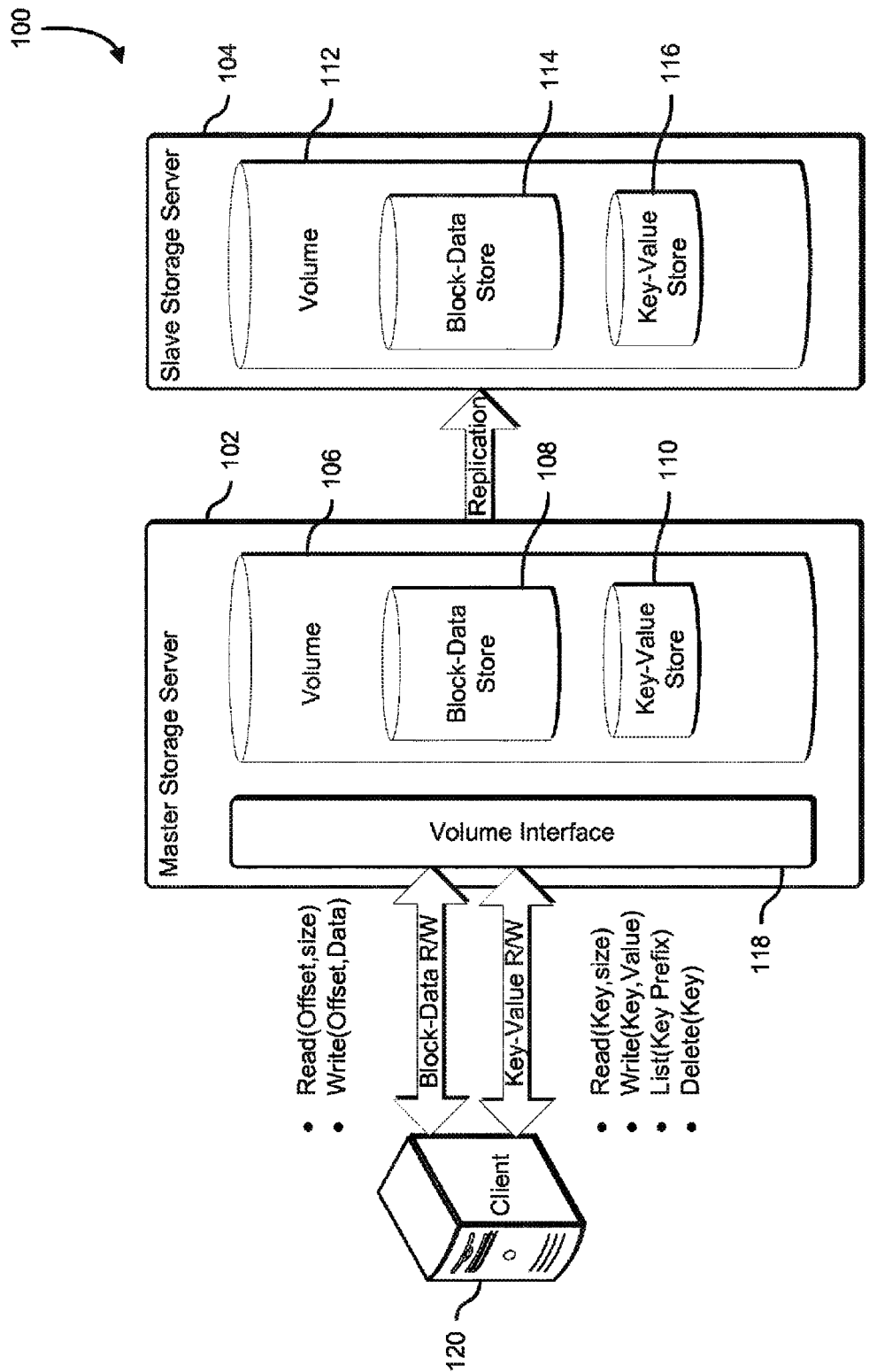
FIG. 1 shows an illustrative example of an environment in which various embodiments may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods that provide a key-value store that is associated with a volume on a storage system. The key-value store is accessible to clients via a key-value interface provided by the storage system. A data store, such as a block-data store, is provided by the volume in addition to the key-value store. The data store is accessible to clients via an interface such as a block-data interface. In various implementations, the key-value store can be used to store volume-based I/O throttling information, volume-based diagnostic information, information used for migration of the attached computing instance to another computing instance (e.g., live migration), or other volume-based information. In some environments, the volume spans more than one partition, and a key-value data store on each partition of the volume is accessible by a client. If the volume spans more than one partition, volume-based key-value records can be stored on each partition of the volume, and the volume-based key-value records can be synchronized across each partition of the volume. Synchronization of key-value records across partitions can be performed by the client or by a synchronization process on the storage system.

In some environments, a plurality of clients can attach to the storage system and access shared data sequentially or in parallel. In such environments, the storage system can provide synchronization operations that facilitate coordinated access to the storage system by the clients. In one example, the storage system provides a compare and swap operation that compares the value of a particular key-value record to a first value, and if the value of the particular key-value matches the first value, sets the value of the particular key value to a new value, and returns a value of True to the requester. In another example, the storage server makes a test-and-set operation available to clients. The test-and-set operation allows key-values to be used to synchronize access to shared resources.

In some implementations, the storage system manages a plurality of physical storage devices which are arranged as a logical volume. A block-level or block-data interface to the logical volume is provided by the storage system to a client. The block-data interface supports block-data or block-level operations such as block-level read and write operations. In some environments, the logical volume is divided into one or more partitions. A partition defines a separate portion of the logical volume that has a block-data store that is separate from the remainder of the logical volume. A particular volume can include a plurality of nonoverlapping partitions. Each partition of the plurality of partitions can include a separate key-value store. A particular partition of the plurality of partitions can be designated to retain volume-based key-value information or, in some implementations, volume-based key-value information can be synchronized between key-value stores located on each partition of the plurality of partitions on the volume.

In various implementations, the storage system provides a storage system interface that enables a client to submit a variety of key-value operations to the storage server. The storage system interface includes a hardware interface and tangible computer-readable media containing instructions that, when executed, perform a variety of key-value operations that operate on the key-value store. In one example, read, write, list, and delete operations are provided by the storage system interface. The read operation takes a key as a parameter and returns an associated value from the key-value store. The write operation takes a key and a value as parameters and, if the key does not exist in the key-value store, adds a new key-value record having the key and the value to the key-value store. If the key does exist in the key-value store, the existing value associated with the key is updated with the parameter value. The list operation returns some or all of the keys stored in the key-value store. The list operation takes a prefix as an optional parameter. If a prefix is provided, the list operation returns the keys within the key-value store that begin with the prefix. If a prefix is not provided, the list operation returns all the keys within the key-value store. The delete operation takes a single key as a parameter, and removes the key-value entry associated with the key from the key-value store. Additional operations support the attachment and detachment of a client to and from the storage system.

In some implementations, the storage system can be accessed by more than one client, possibly concurrently. In such implementations, a key-value store associated with a volume can be accessed by more than one client, causing potential synchronization problems when key-value records are updated. In some implementations, a compare-and-swap ("CAS") operation is provided by the storage system to facilitate synchronization between clients. The CAS operation takes a key, an old value, and a new value as parameters. The storage system performs the CAS operation as a unitary operation, temporarily blocking other access to a key-value record associated with the key. If the old value matches the value of the key-value, the value of the key-value will be updated to the new value, and the CAS operation will return a value of true. If the old value does not match the value of the key-value record, the CAS operation returns a value of false, and the value of the key-value is not changed.

In some environments, the storage system provides a key-value store that is used to maintain parameters associated with I/O throttling. For example, in some implementations, a burst bucket quota and a timestamp associated with a particular volume are stored in the key-value store of the volume. The timestamp records when a client updates throttling parameters associated with the volume. In some implementations, the timestamp is updated by the client, and in other implementations, the storage server updates the timestamp as a consequence of updating the throttling parameters. As a result of a client connecting to the volume, the timestamp is read from the key-value store and compared to the current time. The burst bucket quota can be adjusted based on an amount of time that the client has not used burst I/O operations. As I/O operations are performed on the volume, the client updates the burst bucket quota. In some implementations, more than one client accesses the volume, and each client maintains a separate burst bucket and timestamp. A volume quota can be determined by aggregating the burst bucket quotas of each client or, in another implementation, by sharing a single burst bucket key-value record amongst multiple clients. In particular implementations, a volume includes a plurality of partitions, and throttling parameters associated with the volume are maintained in a key-value store that is associated with the volume. In some implementations, throttling parameters associated with the volume are maintained in key-value stores on each partition of the volume, and the throttling parameters are synchronized by the client across the partitions of the volume.

FIG. 1 shows an illustrative example of an environment in which various embodiments may be practiced. A diagram 100 shows a storage system that includes a master storage server 102 and a slave storage server 104. The master storage server 102 includes a volume 106 that has a block-data store 108 and a key-value store 110. The master storage server 102 and the slave storage server 104 can be implemented by one or more computer servers. The volume 106 can be implemented using one or more physical storage devices arranged as a single logical volume. The physical storage devices can be based on solid-state memory, disk-based memory, optical storage, flash memory, magnetic tape, or other storage technology. The block-data store 108 occupies a portion of the volume 106, and holds block data that is accessible using an address or offset. The key-value store 110 occupies another portion of the volume 106, and includes key-value records, each key-value record of the included key-value records having a key and a value. The key holds an identifier that is used to access the record. In various implementations, the key can be an integer, a string, a sequence of bytes, a sequence of Unicode characters, or other identifier. In various implementations, the value can be an integer, string, a sequence of bytes, a data structure, a time, or other value. The slave storage server 104 includes a slave volume 112, a slave block-data store 114, and a slave key-value store 116. The contents of the slave volume 112 are replicated from the data stored on the volume 106. The slave storage server 104 provides redundancy of storage for the storage system.

The master storage server 102 includes a volume interface 118. The volume interface 118 includes hardware that communicates with a client 120 and instructions that, when executed, process requests received from the client 120. For example, in a particular implementation, the volume interface 118 includes a network interface that communicates with the client 120 over a computer network. The client 120 can be a personal computer, notebook computer, a mobile device, a cellular phone, smart phone, or other networked computing device. In a particular implementation, the volume interface 118 supports particular requests that request access to the key-value store 110 and the block-data store 108.

In many implementations, the storage system provides a block-data interface to one or more volumes or partitions. Block data is arranged as a sequence of words, bytes, or bits of a particular length. Access to block data is achieved by specifying a request offset (or address) and a request length. The request offset can take a variety of forms. For example, a hard disk drive can present an interface that takes a cylinder number, head number, and sector number as the request offset. In another example, another hard disk drive presents an interface that takes a single-vector logical block address ("LBA") as the request offset. If a volume is divided into a number of partitions, each partition of the number of partitions can have a separate block-data address space.

In various implementations, the volume interface 118 supports a number of block-data commands for reading and writing data to and from the block-data store 108. A read command allows the client 120 to obtain block data from the block-data store 108. The read command accepts an offset and a size as parameters. In some implementations, the offset is a single-vector address. In another implementation, the offset is a multi-vector address such as a cylinder, head, and sector. The size specifies the amount of data to read in bits, bytes, words, or other units. The read command returns the requested block of data from the block-data store 108. The write command accepts an offset and a block of data as parameters. The offset can be an address or other type of offset listed above. The block of data is a sequence of bits, bytes, or words of data with an associated size. The write command stores the block data at the indicated offset within the block-data store 108.

In some implementations, the volume interface 118 supports a number of key-value commands for reading and writing key-value records to and from the key-value store 110. In various implementations, the volume interface 118 supports a read command, a write command, a list command, and a delete command for manipulating key-value records stored in the key-value store 110.

The read command retrieves key-value records from the key-value store 110. In certain implementations, the read command accepts a key and a size as parameters. The key is an identifier used to locate an associated value in the key-value store 110. In various implementations, the key is a string, an integer, a globally unique identifier ("GUID"), a Unicode string, a byte sequence, or other identifier. The size parameter is the maximum length of the returned value. The read command retrieves the value associated with the key from the key-value store 110. If the retrieved value is larger than the maximum length specified by the size parameter, an error is returned to the client 120. If the retrieved value is less than or equal to the maximum length specified by the size parameter, the value is returned to the client 120. In some implementations, the read command accepts a key, a pointer to a buffer, and a buffer size. The value associated with the key is written into the buffer provided that the length of the value is less than or equal to the buffer size.

The write command stores key-value records to the key-value store 110. In certain implementations, the write command accepts a key and a value as parameters. The key is an identifier used to locate an associated value in the key-value store 110. In various implementations the key is a string, integer, or other identifier specified above. If a record having the key is pre-existing in the key-value store 110, the write command overwrites the existing value of the pre-existing record. If a record having the key is not present in the key-value store 110, the write command creates a new record in the key-value store 110, the new record having the key and the value specified by the write command.

The list command returns a collection of keys from the key-value store 110. In certain implementations, the list command accepts a key prefix as a parameter. Key-value records in the key-value store 110 are examined and keys that match the key prefix are assembled into collection of keys that are returned to the client 120. The collection of keys can be organized as a linked list, an array, a B-tree, or other collection. In some implementations, the key prefix may be omitted from the list command, and a collection containing all keys in the key-value store 110 is returned to the client 120. In some implementations, the list command includes a key filter in the form of a regular expression. Keys contained in the key-value store 110 that match the regular expressions are returned in a collection to the client 120.

The delete command removes a key-value record from the key-value store 110. In certain implementations, the delete command takes a key as a parameter. If the key is present in the key-value store 110, the key-value record associated with the key is removed from the key-value store 110. If the key is not present in the key-value store 110, an error is returned to the client 120.

Figure 2:
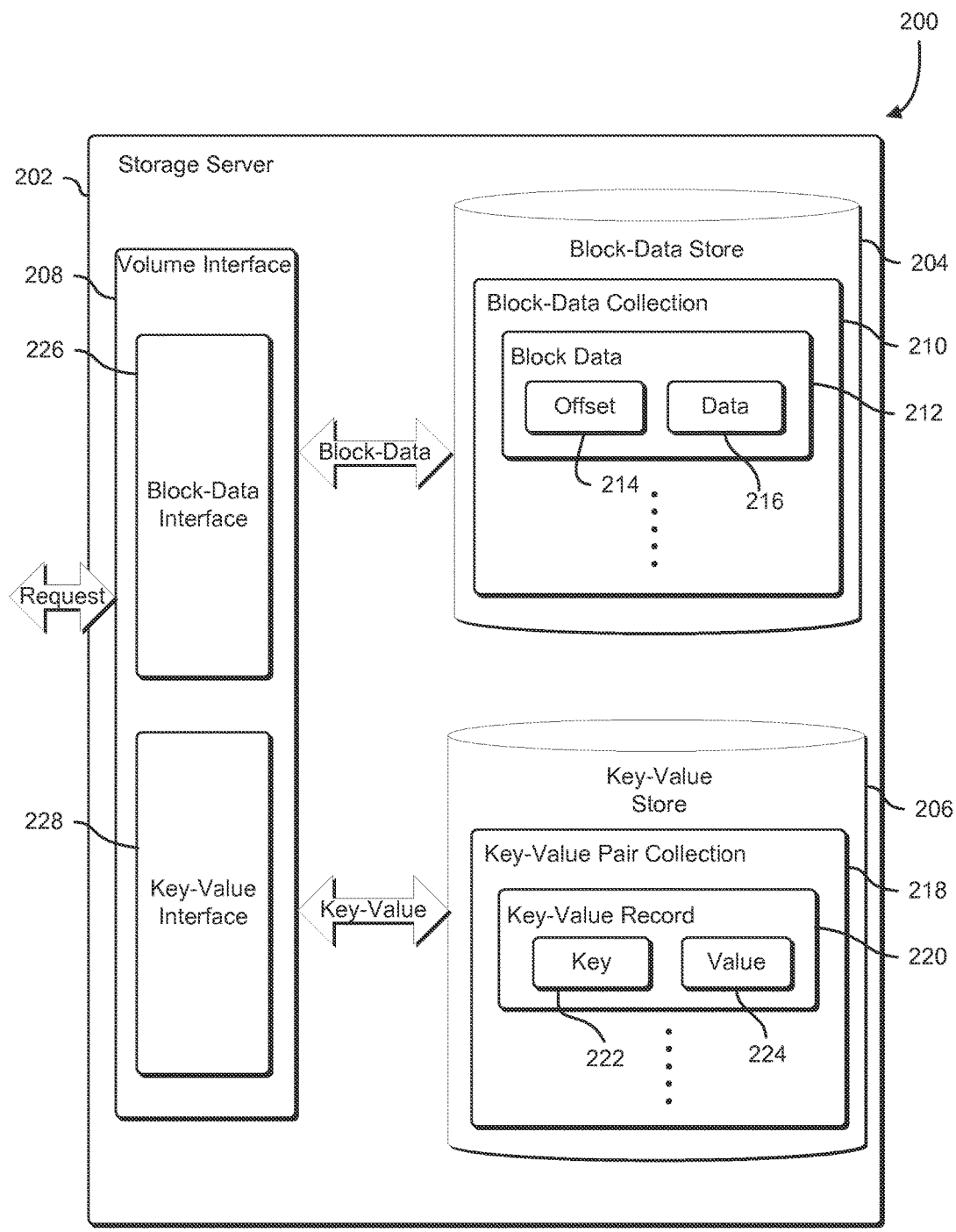
FIG. 2 shows an illustrative example of a storage server that includes a block-data store and a key-value store, in accordance with an embodiment.

FIG. 2 shows an illustrative example of a storage server that includes a block-data store and a key-value store, in accordance with an embodiment. A block diagram 200 shows a storage server 202. The storage server 202 can be implemented as a computer system, network attached storage ("NAS") device, online storage service, fiber Channel storage system, or other storage platform. The storage server 202 includes a block-data store 204, a key-value store 206, and a volume interface 208. The block-data store 204 and the key-value store 206 reside on a logical volume implemented by the storage server 202. The logical volume can be stored on a number of physical volumes such as disk drives, solid-state drives, optical drives, or other hardware storage devices.

The block-data store 204 retains block data in a block-data collection 210. The block-data collection can be implemented as an array, B-tree, or other ordered collection. In some implementations, the logical volume includes a block-data interface, and the block-data store 204 is implemented using the interface of the logical volume. When the block-data collection 210 is implemented as a B-tree, the block-data collection 210 retains a number of block-data records 212, each block-data record of the number of block-data records having an offset 214 and an amount of data 216.

The key-value store 206 retains key-value records in a key-value pair collection 218. The key-value pair collection 218 can be implemented as a sorted array, a binary tree, a B-tree, a hashtable, or other collection. In a particular embodiment, the key-value pair collection 218 is implemented as a B-tree that contains a number of key-value records 220. Each key-value record 220 of the number of key-value records includes a key 222 and a value 224. In some implementations, the key 222 and the value 224 are of arbitrary size. In another implementation, either or both of the key 222 and the value 224 are constrained by a maximum size.

The volume interface 208 implements a block-data interface 226 and a key-value interface 228. The block-data interface receives and fulfills block-data requests that specify block-data operations such as block-level read and write operations from and to the block-data store 204. The key-value interface receives and fulfills key-value requests that specify key-value operations such as key-value read, write, list, and delete operations that operate on the key-value store 206. The volume interface 208 includes interface hardware configured to allow a client to send requests to the storage server 202. Client requests are received by the volume interface 208 and fulfilled by the block-data interface 226 or the key-value interface 228 based on the type of the request. In some implementations, block-data requests and key-value requests are arranged in a shared format and are transmitted to the volume interface 208 over a shared communication channel. In another implementation, block-data requests have a different format than key-value requests, and are transmitted over separate communication channels.

In one example, block-data requests and key-value requests have a shared format that includes a command word and a data block. The command word is an enumeration that takes on various values to signify particular commands such as key-value read, key-value write, block-data read, and block-data write. The data block comprises a number of sequential bytes along with a length. The data block is used as a parameter, the format of which is based at least in part on the value of the command word. In one example, the command word signifies the command of block-data write, and a first portion of the data block indicates an address, and the remainder of the data block is data to be written at the indicated address.

In a particular implementation of the storage server 202, the logical volume implemented by the storage server 202 is implemented as a B-tree, which provides a block-data interface to the logical volume. A portion of the B-tree is used to implement the block-data store 204, and a separate portion of the B-tree is used to implement the key-value store 206.

Figure 3:
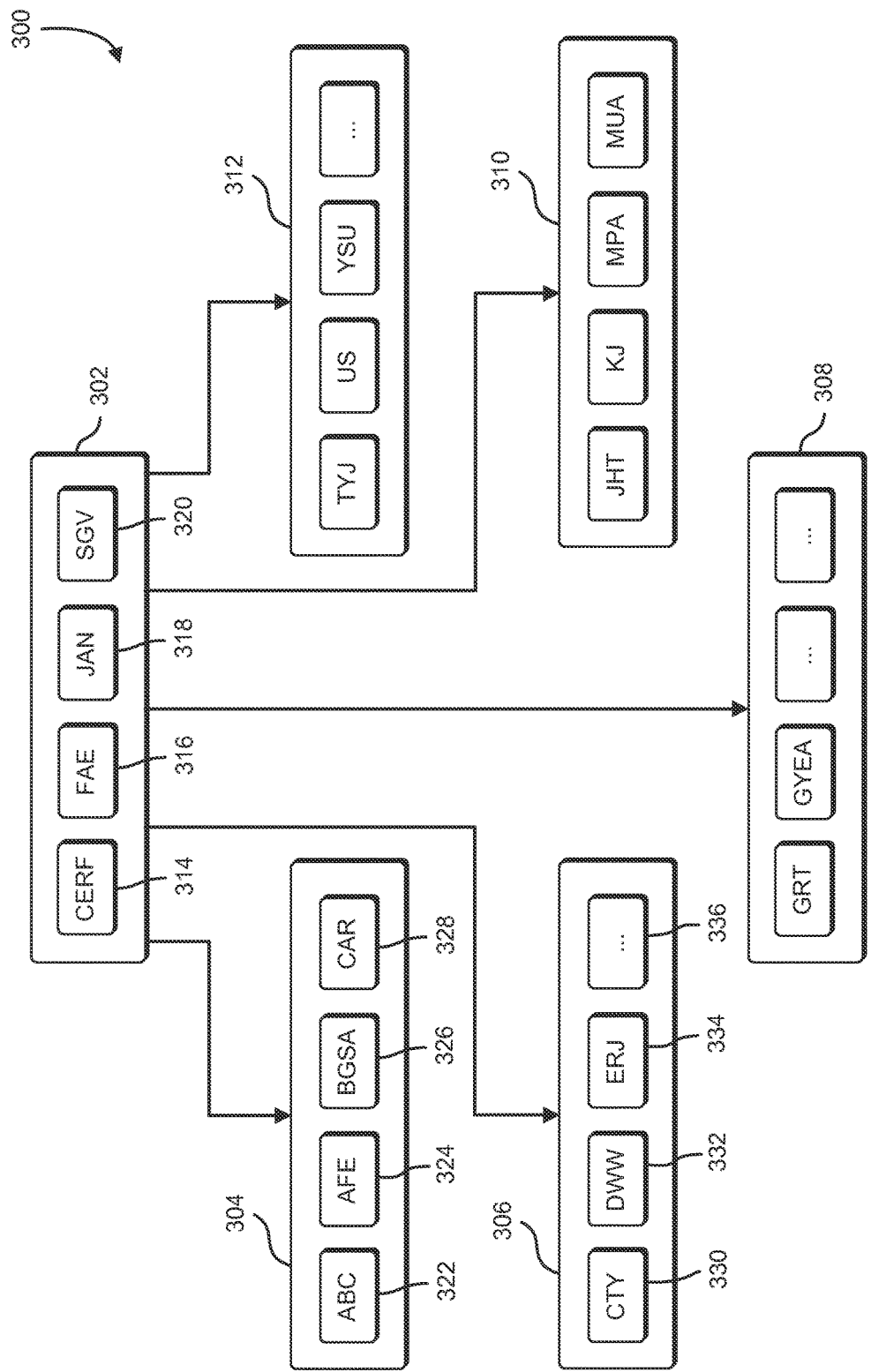
FIG. 3 shows an illustrative example of a collection of key-value pairs stored in a B-tree, in accordance with an embodiment.

FIG. 3 shows an illustrative example of a collection of key-value pairs stored in a B-tree, in accordance with an embodiment. B-tree structures are described in a paper by Bayer, Rudolf and Edward M. McCreight, "*Organization and Maintenance of Large Ordered Indexes,*" Acta Informatica 1:173-189, 1972, which is incorporated herein by reference. A number of B–Tree variations have been produced such as the B+Tree and the B*Tree. B–Tree variants are described in Comer, Douglas (June 1979), "*The Ubiquitous B–Tree,*" Computing Surveys 11(2):123-137, which is incorporated herein by reference.

A diagram 300 illustrates an example of a B–tree that contains key-value records. The B–tree includes an internal node 302 and five leaf nodes 304, 306, 308, 310, and 312. Each node of the B–tree contains a number of key-value records that are organized based on a key associated with each key-value record. The internal node 302 contains four key-value records: a first key-value record 314, a second key-value record 316, a third key-value record 318, and a fourth key-value record 320. The four key-value records define five nonoverlapping key spaces. A first leaf node 304 contains key-value records with keys less than the first key-value record 314. Each of the key-value records 322, 324, 326, and 328 have key values less than the key of the first key-value record 314. A second key space is defined by the first key-value record and the second key-value record. A second leaf node 306 contains key-value records with keys greater than the key of the first key-value record 314 and less than the key of the second key-value record 316. Each of key-value records 330, 332, and 334 have keys in the above range. The third key space includes key-value records with keys that are between the key of the second key-value record 316 and the key of the third key-value record 318. The fourth key space includes key-value records with keys that are between the key of the third key-value record 318 and the key of the fourth key-value record 320. The fifth key space includes key-value records with keys that are greater than the key of the fourth key-value record 320. In some situations, a B-tree node contains less than a maximum number of key-value records. For example, the second leaf node 306 includes an empty slot 336. In various implementations the B-tree is defined as having between a minimum and a maximum number of key-value records in each node. In the implementation shown, the B-tree has a minimum of two and a maximum of four key-value records per node. Some B-tree and B-tree variants are rebalanced if the addition or removal of key-value records causes the number of key-value records to fall below minimum threshold.

In various embodiments, B-trees and B-tree variants are used to implement a key-value store and/or a block-data store. In some embodiments, a single B-tree instance is used for both the key-value store and the block-data store. The minimum and maximum number of records for each node may be adjusted to balance storage efficiency and rebalancing overhead. Values associated with key-value records can be maintained in block storage outside the B–tree by replacing the value field of the key-value records with a pointer to a location in the block storage.

In certain implementations, a block-data store is implemented using a B+tree. A description of the B+tree is included in the article "*The Ubiquitous B–Tree*" referenced above by Douglas Comer. In certain environments, the B+tree provides efficient retrieval of information arranged in a block-data store.

In additional implementations, the key-value store can be implemented using a variety of collection data structures. Suitable collection structures include a linked list, a sorted array, a hash table, a relational database, a dictionary, a map, or other ordered collection. When a hash table is used to implement the key-value store, a hash function is chosen based at least in part on characteristics of the keys that will be stored in the key-value store.

Figure 4:
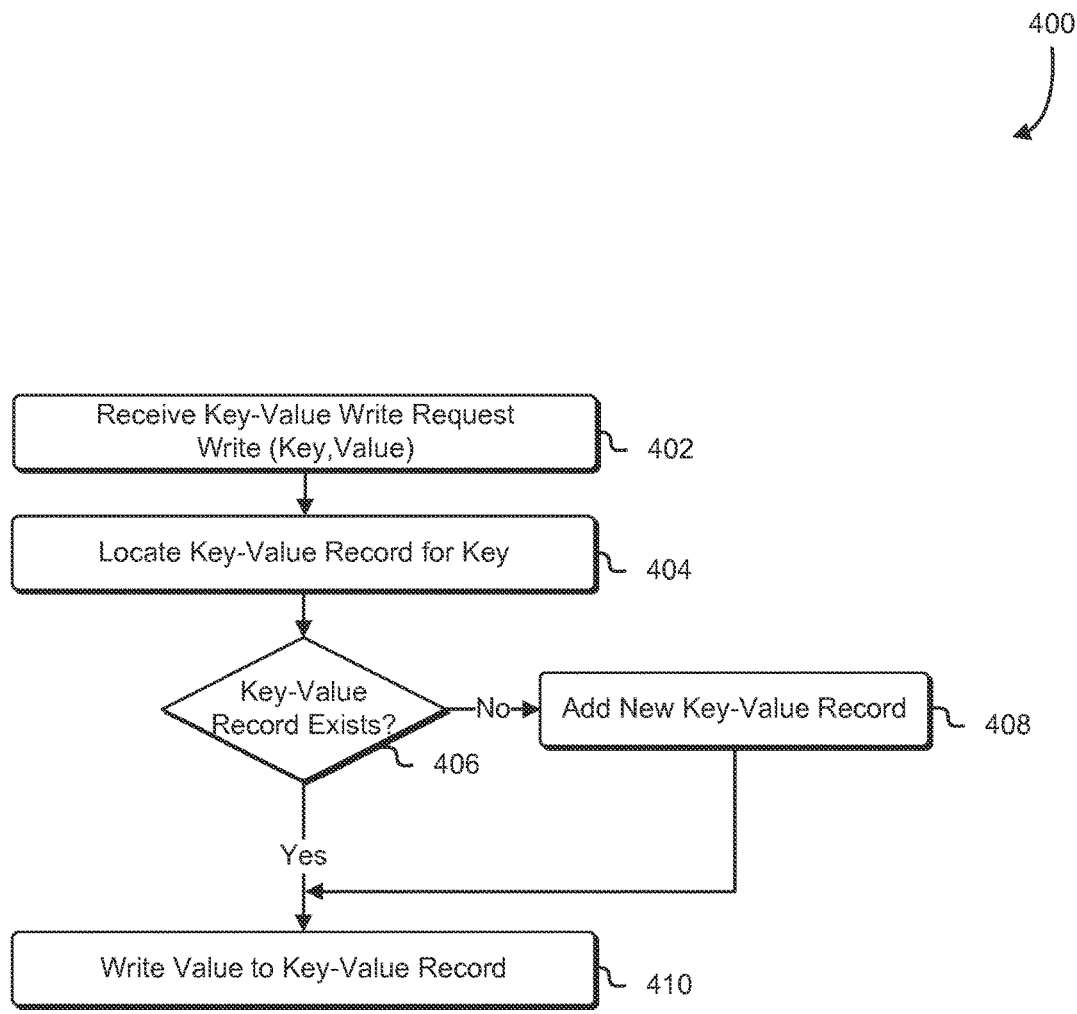
FIG. 4 shows an illustrative example of a process that, when performed by a storage server that hosts a key-value store, writes a key-value record, in accordance with an embodiment.

FIG. 4 shows an illustrative example of a process that, when performed by a storage server, writes a key-value record, in accordance with an embodiment. A process diagram 400 illustrates a process that begins at block 402, where a storage server receives a request to write a key-value record. In some implementations, the request takes the form of a packet of information received via a computer network. In another implementation, the request is received as a function call. In yet another implementation the request is received via a remote procedure call ("RPC"). The request includes a key parameter and a value parameter. At block 404, the storage server attempts to locate a key-value record within a key-value store that has a key that matches the key parameter. In some implementations, the storage server searches a B-tree that is used to implement the key-value store. In another implementation, the storage server queries a database that contains the key-value store. If the storage server determines 406 that the key-value store does not include a record having a key that matches the key parameter, execution proceeds to block 408 where the storage server adds a new key-value record to the key-value store. The new key-value record has a key that matches the key parameter. If the storage server determines 406 that the key-value store contains a record having a key that matches the key parameter, or if a new key-value record has been added to the key-value store, execution proceeds to block 410. At block 410, the key-value record that has a key which matches the key parameter is updated with the value of the value parameter.

In some embodiments, the key-value store imposes limits on the length of a key and/or at the length of a value. As a result of the storage server receiving a write request from a client, the storage server examines the length of the key parameter and the length of the value parameter. If either of the length of the key parameter or the length of the value parameter exceed the maximum allowable key length or value length respectively, the storage server returns an error indication to the requesting client.

Figure 5:
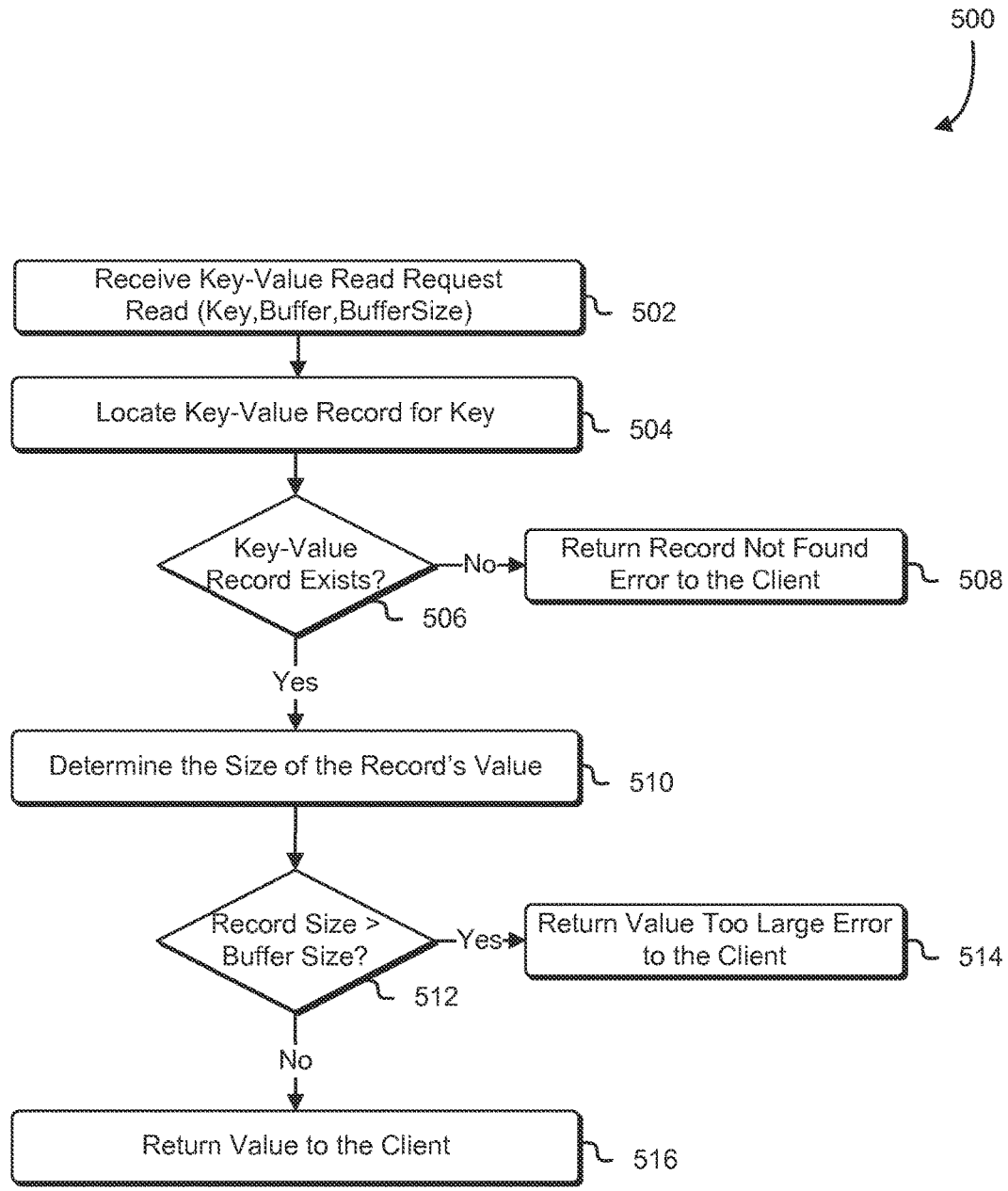
FIG. 5 shows an illustrative example of a process that, when performed by a storage server that hosts a key-value store, reads a key-value record, in accordance with an embodiment.

FIG. 5 shows an illustrative example of a process that, when performed by a storage server, reads a key-value record, in accordance with an embodiment. A process diagram 500 illustrates a process that begins at block 502, where a storage server receives a request to read a key-value record. The request includes a key parameter, a buffer parameter, and a buffer size parameter. The key parameter identifies a particular key-value record that is requested. The buffer parameter is a pointer to writable memory for storing the requested value, and the buffer size parameter is the size of the writable memory pointed to by the buffer parameter.

At block 504, the storage server attempts to locate a key-value record with a key that matches the key parameter, from within a key-value store. If the storage server determines 506 that the key-value store does not include a key-value record that has a key that matches the key parameter, execution proceeds to block 508 and the storage server returns an error to the requesting client indicating that a matching key-value record was not found. If the storage server determines 506 that a key-value record with a key that matches the key parameter exists within the key-value store, the storage server determines 510 the size of the value associated with the matching key-value record. At decision block 512, the storage server determines whether the size of the value of the matching key-value record exceeds the buffer size parameter. If the size of the value of the matching key-value record exceeds the buffer size parameter, the storage server returns 514 an error to the requesting client indicating that the requested value is too large for the provided buffer. If the storage server determines that the size of the value of the matching key-value record is less than or equal to the buffer size parameter, the value of the matching key-value record is copied 516 into the memory indicated by the buffer parameter, and returned to the requesting client.

Figure 6:
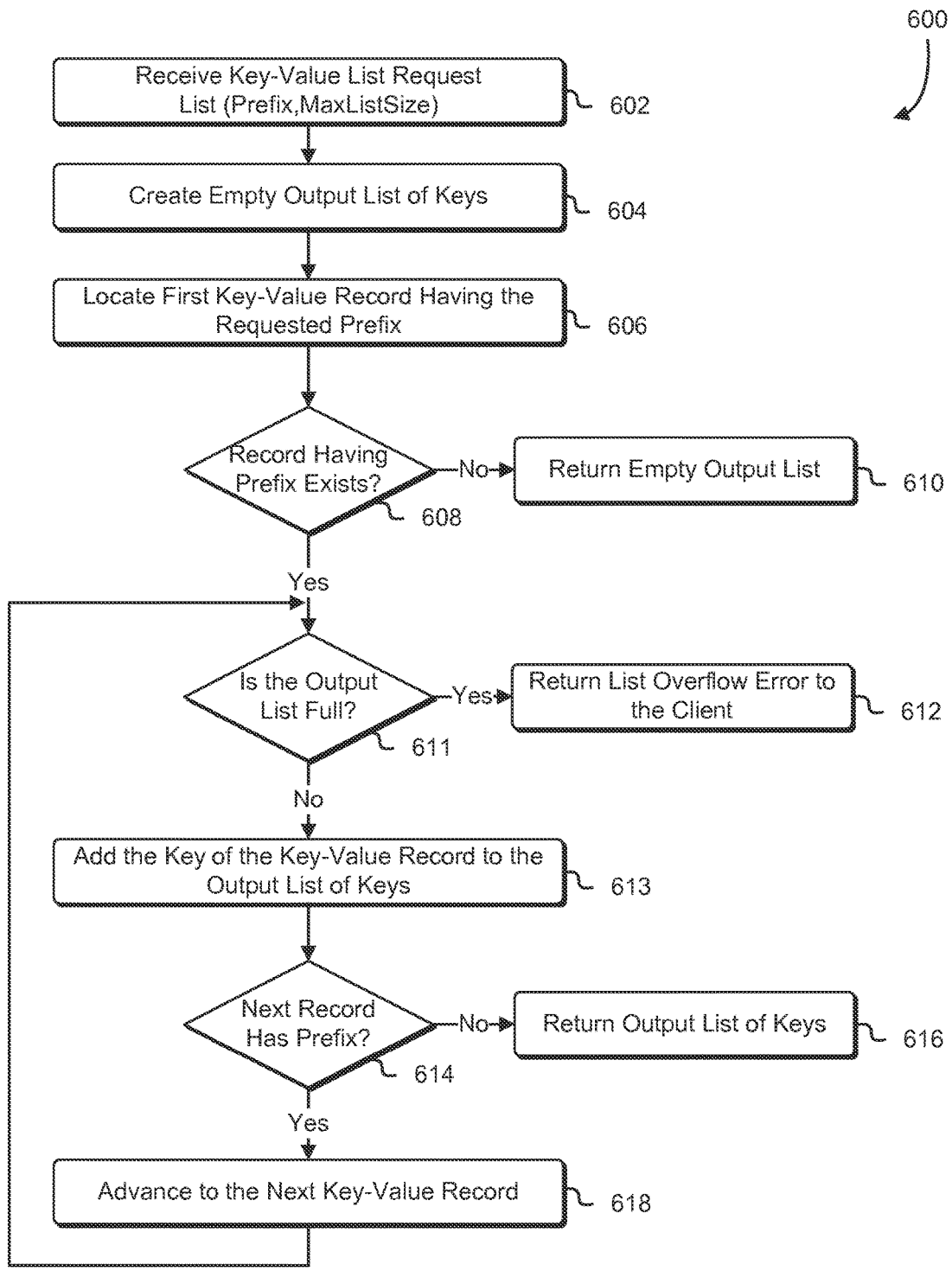
FIG. 6 shows an illustrative example of a process that, when performed by a storage server that hosts a key-value store, lists keys contained in the key-value store, in accordance with an embodiment.

FIG. 6 shows an illustrative example of a process that, when performed by a storage server, lists key-value records stored on the storage server, in accordance with an embodiment. A process diagram 600 illustrates a process that begins at block 602, where a storage server receives a request to provide a collection of keys stored in a key-value store. The request includes a key-prefix parameter that specifies a subset of keys from the set of keys stored in the key-value store, and a MaxListSize parameter that specifies a maximum size for the list of retuned keys. At block 604, the storage server initializes an empty list of keys that will be used to assemble a collection of requested keys. In the process illustrated in FIG. 6, the key-value store is a sorted collection that is ordered by the key field of the key-value records. At block 606, the storage server searches the key-value store and locates the first key-value record having a key that matches the provided key-prefix parameter. If the storage server determines 608 that no key-value record in the key-value store matches the provided key-prefix parameter, execution proceeds to block 610 where the storage server provides the empty list of keys to the requesting client. If the storage server is able to identify a first key-value record having a key that matches the provided key-prefix parameter, execution proceeds to block 611 where the storage server determines 611 if there is sufficient free space in the list of keys to add the located key-value to the list. As a result of the storage server determining that adding the located key-value to the list would exceed the maximum size of the output list, execution proceeds to block 612 and a list-overflow-error is returned to the client. As a result of the storage server determining that adding the located key-value to the list of keys would not exceed the maximum size of the output list, execution proceeds to block 613 where the storage server adds the key of the located first key-value record to the list of keys. The storage server then determines 614 whether the next key-value record in the sorted collection of the key-value store matches the provided key-prefix parameter. If the next key-value record in the sorted collection of the key-value store does not match the provided key-prefix parameter, execution proceeds to block 616 and the storage server returns the list of keys to the requesting client. If the next key-value record in the key-value store has a key that matches the provided key-prefix parameter, the storage server advances 618 processing to the next key-value record and execution returns to blocks 611-613 where the next key is added to the list of keys.

In some implementations, the provided key-prefix parameter is omitted from the request. If the key-prefix parameter is omitted from the request, the list command treats the request as a request for all keys in the key-value store. Alternatively, the list command treats the request as having a universal key-prefix that matches all possible keys.

In another implementation, the provided key-prefix parameter is in the form of a regular expression. A key matches the key-prefix parameter when the regular expression matches the key. The storage server iterates through all keys in the key-value store, testing whether each key matches the regular expression, and placing those keys that match the regular expression into an output key list.

Figure 7:
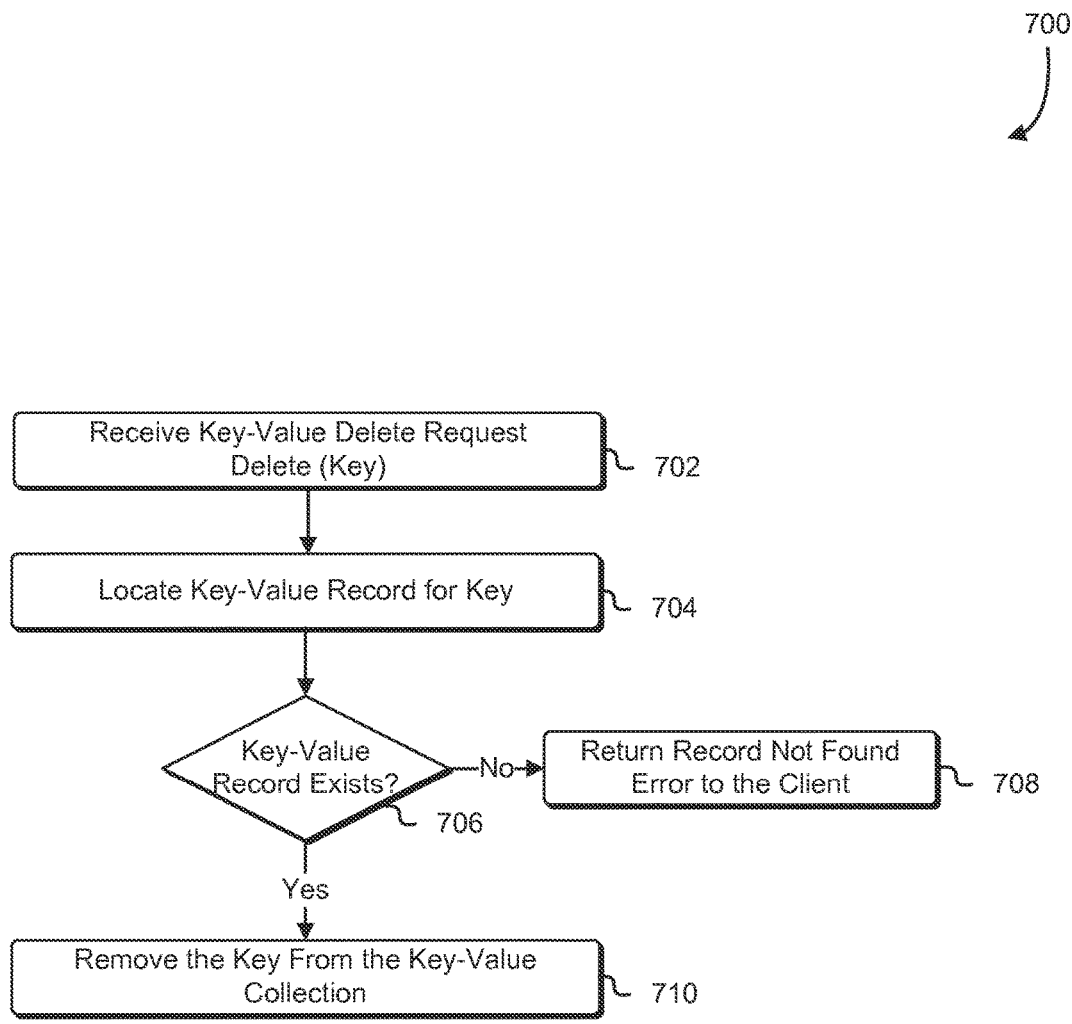
FIG. 7 shows an illustrative example of a process that, when performed by a storage server that hosts a key-value store, deletes a key-value record, in accordance with an embodiment.

FIG. 7 shows an illustrative example of a process that, when performed by a storage server, deletes a key-value record, in accordance with an embodiment. A process diagram 700 illustrates a process that begins at block 702, where a storage server receives a request to a key-value record. The request includes a key parameter that identifies a particular key-value record to remove from the key-value store. At block 704, the storage server attempts to locate a key-value record with a key that matches the key parameter, from within a key-value store. If the storage server determines 706 that the key-value store does not include a key-value record with a key that matches the key parameter, execution proceeds to block 708 and the storage server returns an error to the requesting client indicating that a matching key-value record was not found. If the storage server identifies a key-value record with a key that matches the key parameter, the storage server removes 710 the identified key-value record from the key-value store.

In various embodiments, as a result of the storage server performing operations on the key-value store, the number of key-value records contained in the key-value store may increase or decrease. If the number of key-value records contained in the key-value store changes as the result of a key-value operation, a rebalancing operation may be initiated by the storage server to reclaim unused space and/or maintain operational efficiency of the underlying key-value collection structure, such as a B-tree or B-tree variant.

Figure 8:
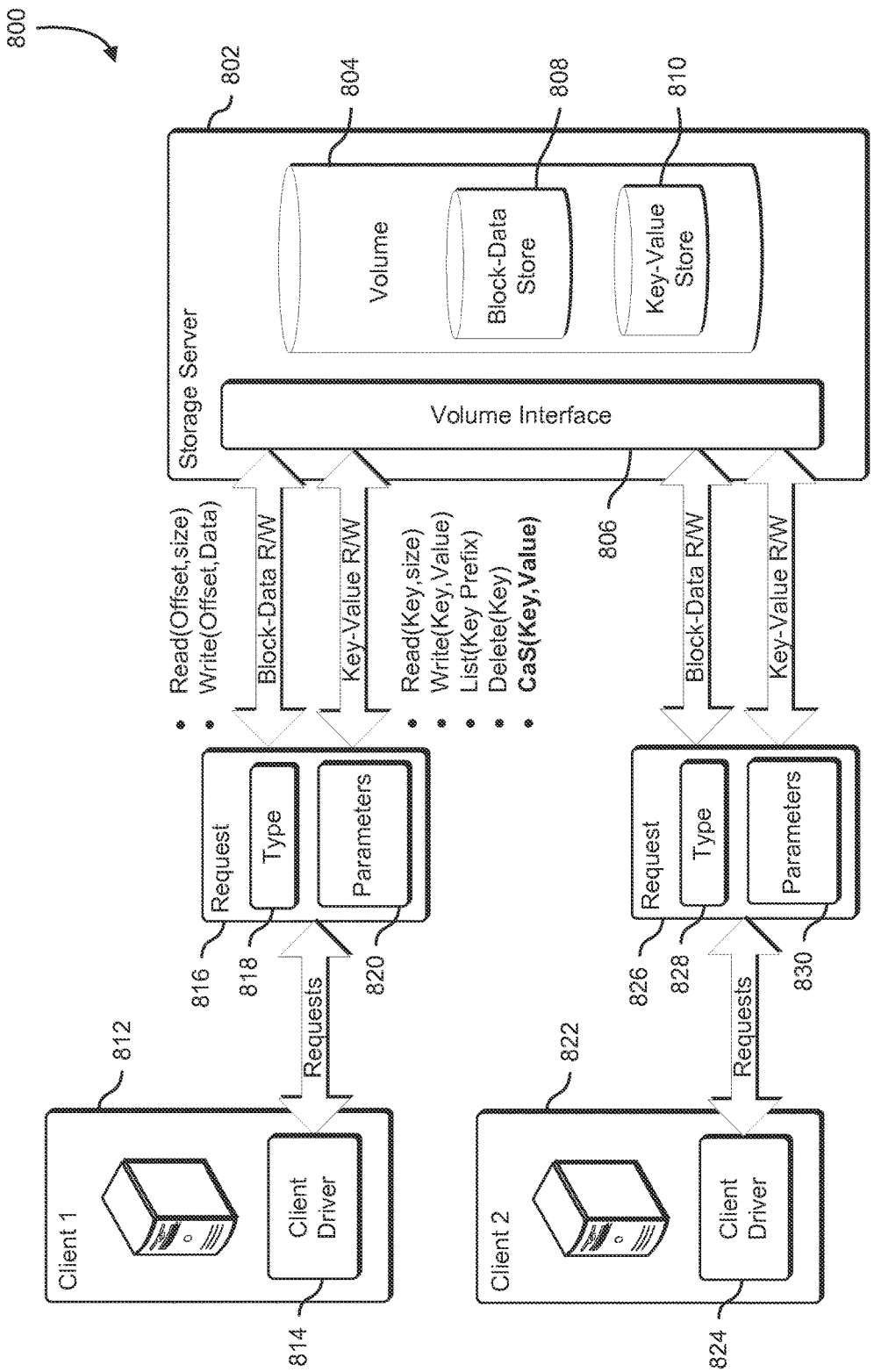
FIG. 8 shows an illustrative example of a storage server with block-data and key-value interfaces in a multi-attach configuration, in accordance with an embodiment.

FIG. 8 shows an illustrative example of a storage server with block-data and key-value interfaces in a multi-attach configuration, in accordance with an embodiment. An environment 800 shows a storage server 802 that includes a volume 804 and a volume interface 806. The volume 804 is implemented using one or more physical storage devices, and includes a block-data store 808 and a key-value store 810. The volume interface 806 includes interface hardware such as a network interface card ("NIC") and instructions that, when executed, process requests from one or more clients. The requests include block-data requests that interact with the block-data store 808 and key-value requests that interact with the key-value store 810. The environment 800 shows two clients interacting with the volume interface 806.

A first client 812 includes a first client driver 814. The first client 812 can be a personal computer, a laptop computer, a tablet computer, a mobile device, a cellular phone, a network appliance, or other computing device. The first client driver 814 comprises executable instructions that, when executed, create and send a request 816 to the volume interface 806. The request 816 includes a type field 818 and a parameters field 820. The type field is defined as an enumeration, where various values of the enumeration correspond to particular request types. For example, the request types block-data read, block-data write, key-value read, key-value write, key-value list, key-value delete, and key-value CAS can be mapped to the integer values one through seven. The format of the parameter field 820 is based at least in part on the value of the type field 818. For example, in the situation where the type field 818 has a value that corresponds to a block-data read request, the parameter field 820 contains an offset parameter and a size parameter. A second client 822 includes a second client driver 824. The second client driver 824 comprises executable instructions that, when executed, create and send a request 826 to the volume interface 806. The request 826 includes a type field 828 and a parameters field 830.

In certain implementations, the first client 812 and the second client 822 interact with the storage server 802 via this volume interface 806 in a parallel fashion. Coordination between the first client 812 and the second client 822 is achieved using a compare-and-swap ("CAS") operation provided by the volume interface 806. The CAS operation is implemented with a process lock that ensures the CAS operation will be completed as an atomic operation that is not interrupted by processing other client requests by the storage server. The CAS operation takes a key parameter, an old value parameter, and a new value parameter, and returns a Boolean value. The CAS operation locates a key-value record in the key-value store that matches the key parameter. The value of the located key-value record is compared to the old value parameter. If the value of the located key-value record matches the old value parameter, the value of the located key-value record is updated to the new value parameter, and the CAS operation returns a value of true. If the value of the located key-value record does not match the old value parameter, the value of the located key-value record is unchanged and the CAS operation returns a value of false. In various environments, the CAS operation can be used to synchronize access to data stored on the volume 804 including key-value records contained in the key-value store 810 and block data stored in the block-data store 808.

Figure 9:
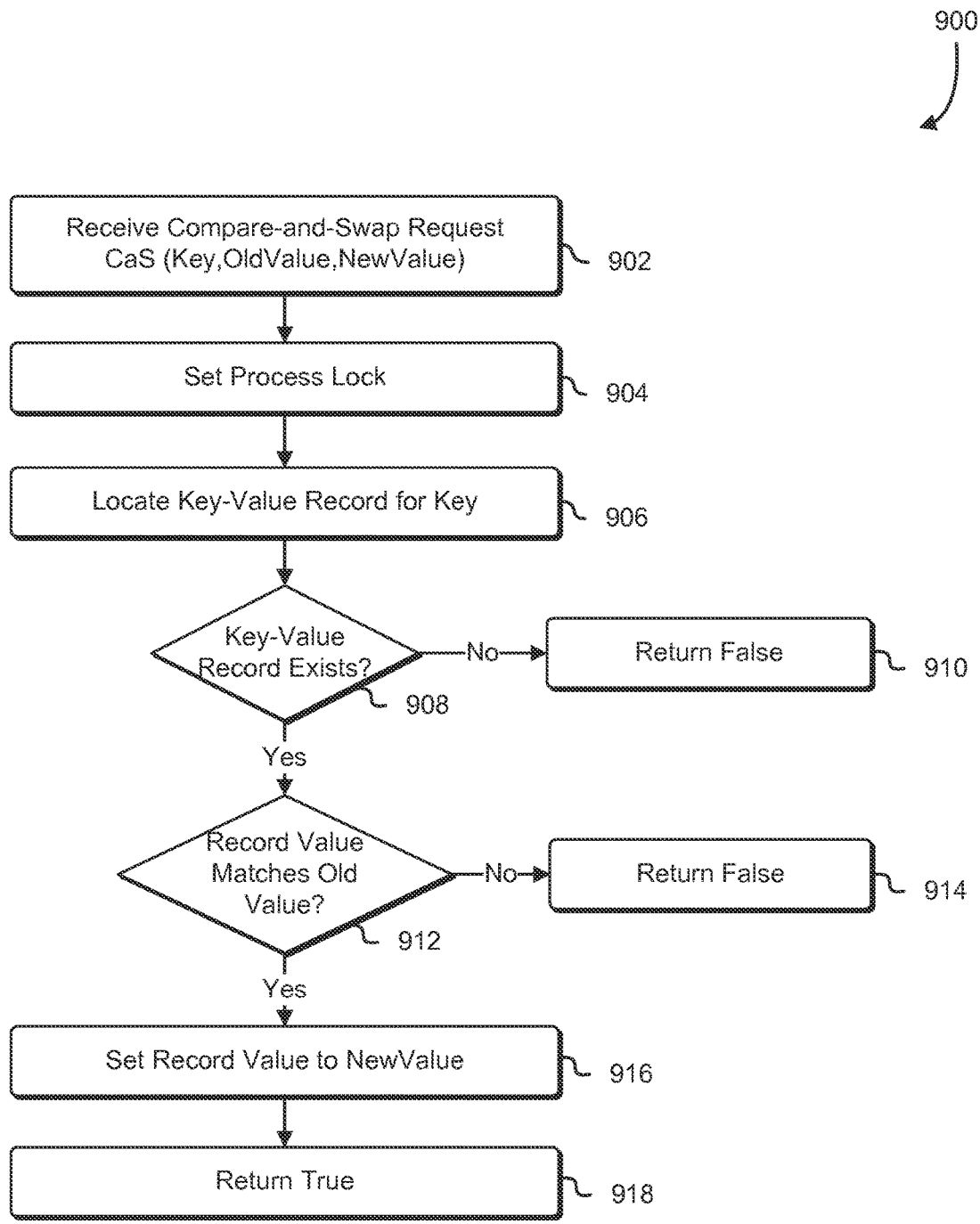
FIG. 9 shows an illustrative example of a process that, when performed by a storage server, performs a compare-and-swap operation on a key-value record, in accordance with an embodiment.

FIG. 9 shows an illustrative example of a process that, when performed by a storage server, performs a compare-and-swap operation on a key-value record, in accordance with an embodiment. A process diagram 900 illustrates a process that begins at block 902, where a CAS request is received at a storage server. The CAS request includes a key parameter, an old value parameter, and a new value parameter. At block 904, the storage server sets a process lock that prevents interruption of the CAS process. In some implementations, the process lock is set by disabling interrupts on a computing system. In another implementation, the process lock is set by setting a mutual exclusion flag. In yet another implementation, the process lock is set using a semaphore. After the process lock is set, the storage server attempts to locate a key-value record with a key that matches the key parameter, from within a key-value store. If the storage server determines 908 that the key-value store does not include a key-value record with a key that matches the key parameter, execution proceeds to block 910 and a return value of false is returned to the requesting client. If the storage server identifies a particular key-value record with a key that matches the key parameter, the storage server compares 912 the value of the particular key-value record to the old value parameter. If the value of the particular key-value record does not match the old value parameter, execution proceeds to block 914 and a return value of false is returned to the requesting client. If the value of the particular key-value record matches the old value parameter, execution proceeds to block 916 where the storage server sets the value of the particular record to the new value parameter. At block 918, the storage server releases the process lock and returns a value of true to the requesting client.

In various environments, the CAS operation can be used to coordinate access to a volume provided by a storage server, or particular stores within the volume such as a key-value store. The CAS operation allows various performance parameters, diagnostic values, and other information associated with the storage server to be accessed and updated safely by a plurality of clients.

In some embodiments, the key-value store is used to retain various client operational parameters. In one example, a virtual machine is migrated from one physical host computer to another physical host computer. Operational parameters associated with the virtual machine before migration are stored in the key-value store located on a network-connected storage volume. The operational parameters in the key-value store are used by the migrated machine to maintain consistent I/O throttling parameters and other operational parameters throughout the migration process.

Figure 10:
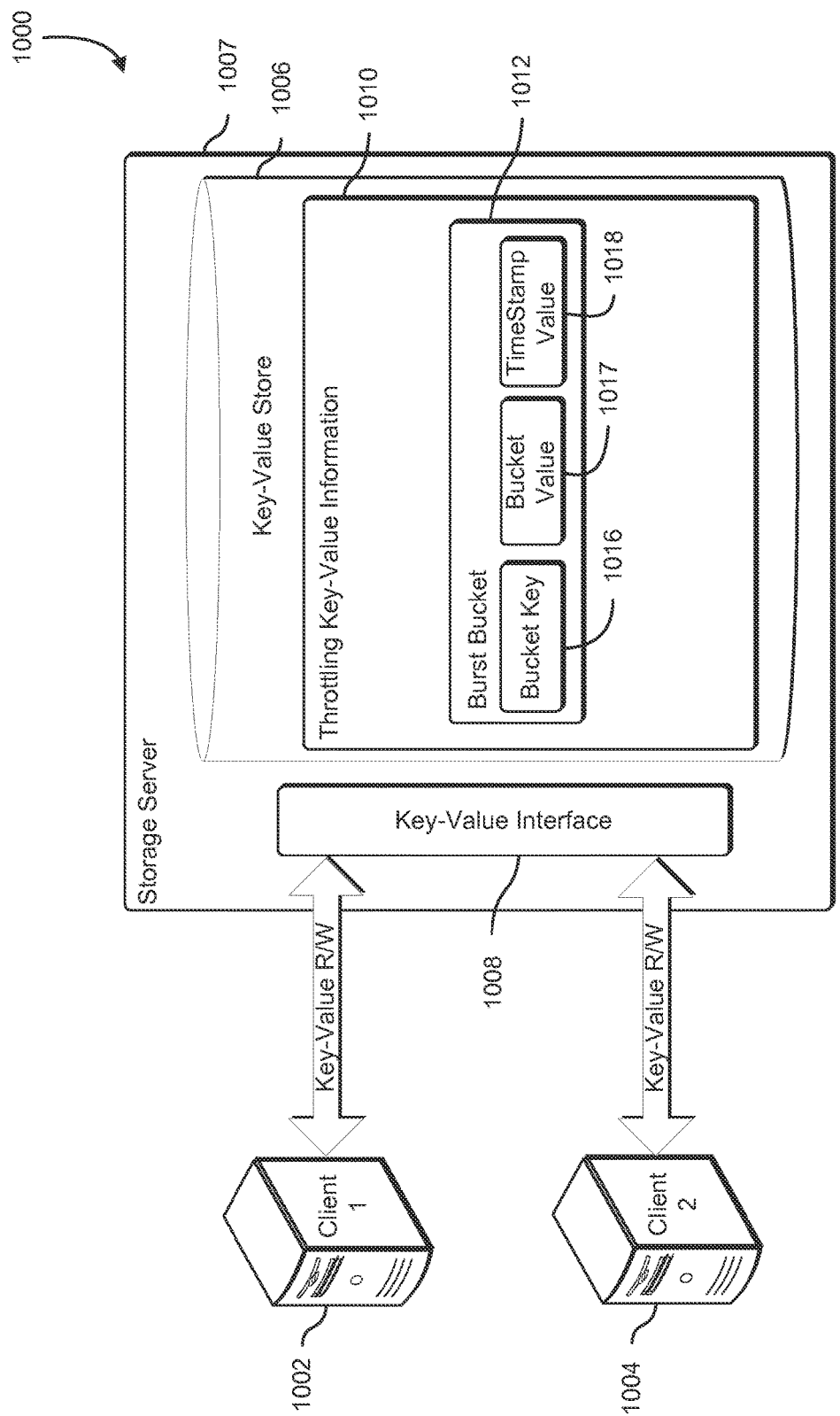
FIG. 10 shows an illustrative example of a key-value storage system that stores throttling parameters, in accordance with an embodiment.

FIG. 10 shows an illustrative example of a key-value storage system that stores throttling parameters, in accordance with an embodiment. A diagram 1000 illustrates a first client 1002 and a second client 1004 accessing a key-value store 1006. The key-value store 1006 is implemented on a storage server 1007 and is associated with a volume provided by the storage server. The volume includes a block-data store that is used by the first client 1002 and the second client 1004 for general computing purposes. The key-value store 1006 is accessible via a key-value interface 1008. The key-value interface 1008 includes hardware that interfaces with the first client 1002 and the second client 1004, as well as instructions that, when executed by a processor on storage server 1007, process client requests that are received by the key-value interface 1008.

The key-value store 1006 retains throttling key-value information 1010. The throttling key-value information 1010 includes a bucket size record 1012. The bucket size record 1012 is a key-value record that includes a bucket key 1016, a bucket value 1017, and a timestamp value 1018. The throttling key-value information is used by the first client 1002 and the second client 1004 to implement client-side throttling of I/O associated with the block-data store provided by the storage server 1007. For example, as a result of the first client 1002 using a particular amount of burst I/O, the first client 1002 accesses the bucket size record 1012 and reduces the bucket value 1017 by the particular amount of burst I/O. As a result of the bucket value being updated, the timestamp value 1018 is updated to the current time. In some implementations, the bucket value 1017 and the timestamp value 1018 are combined into a single writeable value of a key-value pair. For example, the bucket value 1017 and the timestamp value 1018 may be represented as a string having the format "nnnnnn,MM/DD/YY:HH:MM:SS" such as "004315,06/12/15:08:43:23." The first client 1002 and the second client 1004 may coordinate access to the throttling key-value information 1010 using a locking mechanism such as a CAS operation provided by the key-value interface 1008. The timestamp value 1018 records the time when the burst bucket was last used. When a particular client connects to the storage server 1007, the particular client can read the timestamp value 1018 and compare the timestamp value 1018 to the current time. The elapsed time can be used to determine an amount of burst recovery to apply to the bucket value 1017. In some implementations, the throttling key-value information 1010 includes a bucket size record 1012 for each client of the storage server.

Figure 11:
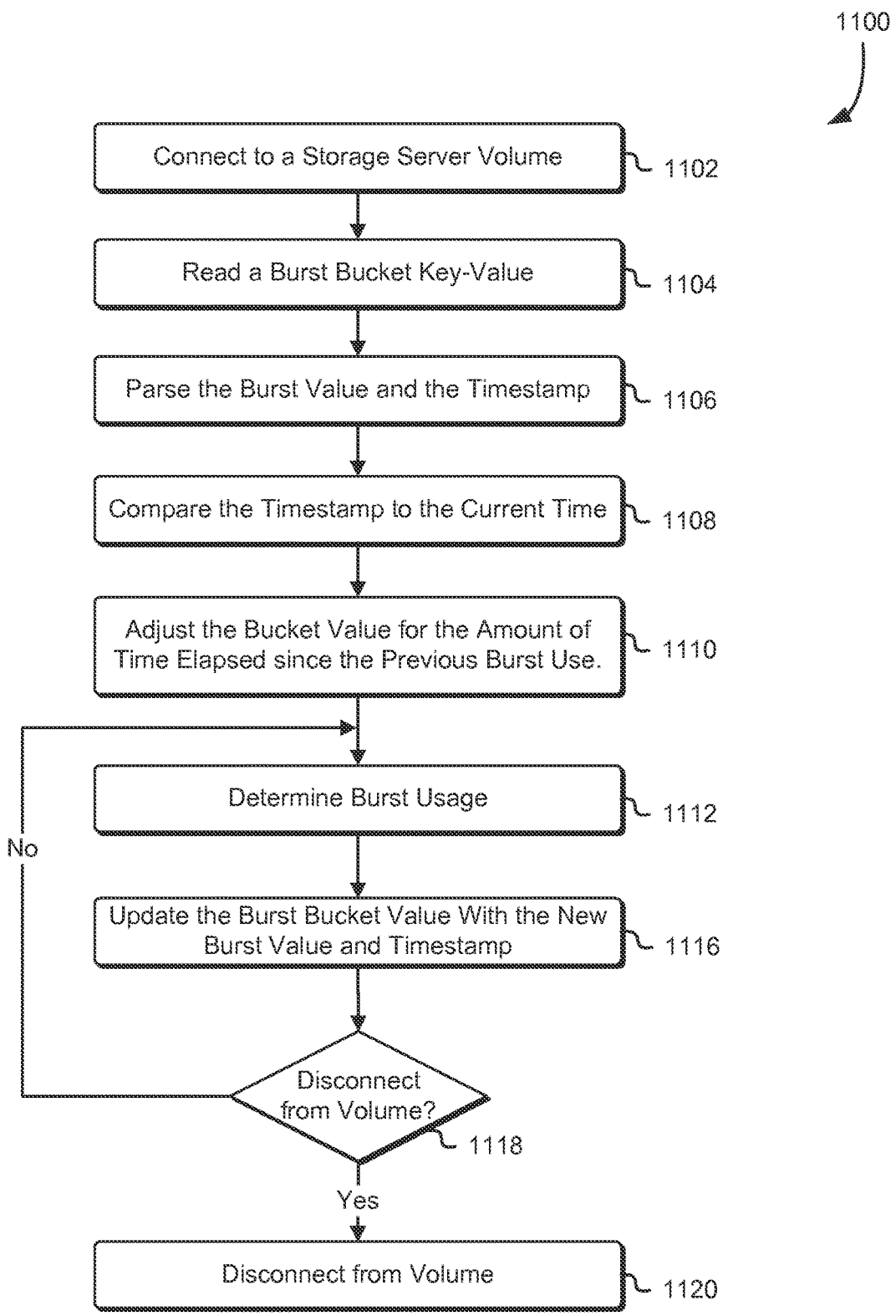
FIG. 11 shows an illustrative example of a process that, when performed by a client, manages an input/output ("IO") throttling parameter, in accordance with an embodiment.

FIG. 11 shows an illustrative example of a process that, when performed by a client, manages an input/output ("IO") throttling parameter, in accordance with an embodiment. A process diagram 1100 illustrates a process that begins at block 1102, where a client connects to a storage server to access a volume with a block-data interface. A Throttling module on the client connects to a key-value store on the volume, and reads 1104 a key-value record that holds a burst bucket value and timestamp. At block 1106, the client parses the value to separate the burst-bucket value from the timestamp. In some implementations, the timestamp and burst-bucket value are maintained in separate key-value records. The client compares 1108 the timestamp to the current time and determines an amount of time that has elapsed since the previous burst use. At block 1110, the client adjusts the burst bucket value based on the amount of time that has elapsed since the previous burst use. The adjusted burst bucket value is written to the key-value store.

At block 1112, a loop begins that updates the burst value and the timestamp. At block 1112, as the client performs I/O operations with the block-data store, the client determines an amount of burst I/O used. The burst bucket value and timestamp are updated 1116 accordingly and written to the key-value store. So long as the client determines 1118 to remain connected to the storage server, execution returns to block 1112. If the client determines to disconnect from the volume, execution proceeds to block 1120 and the client disconnects from the storage server.

Figure 12:
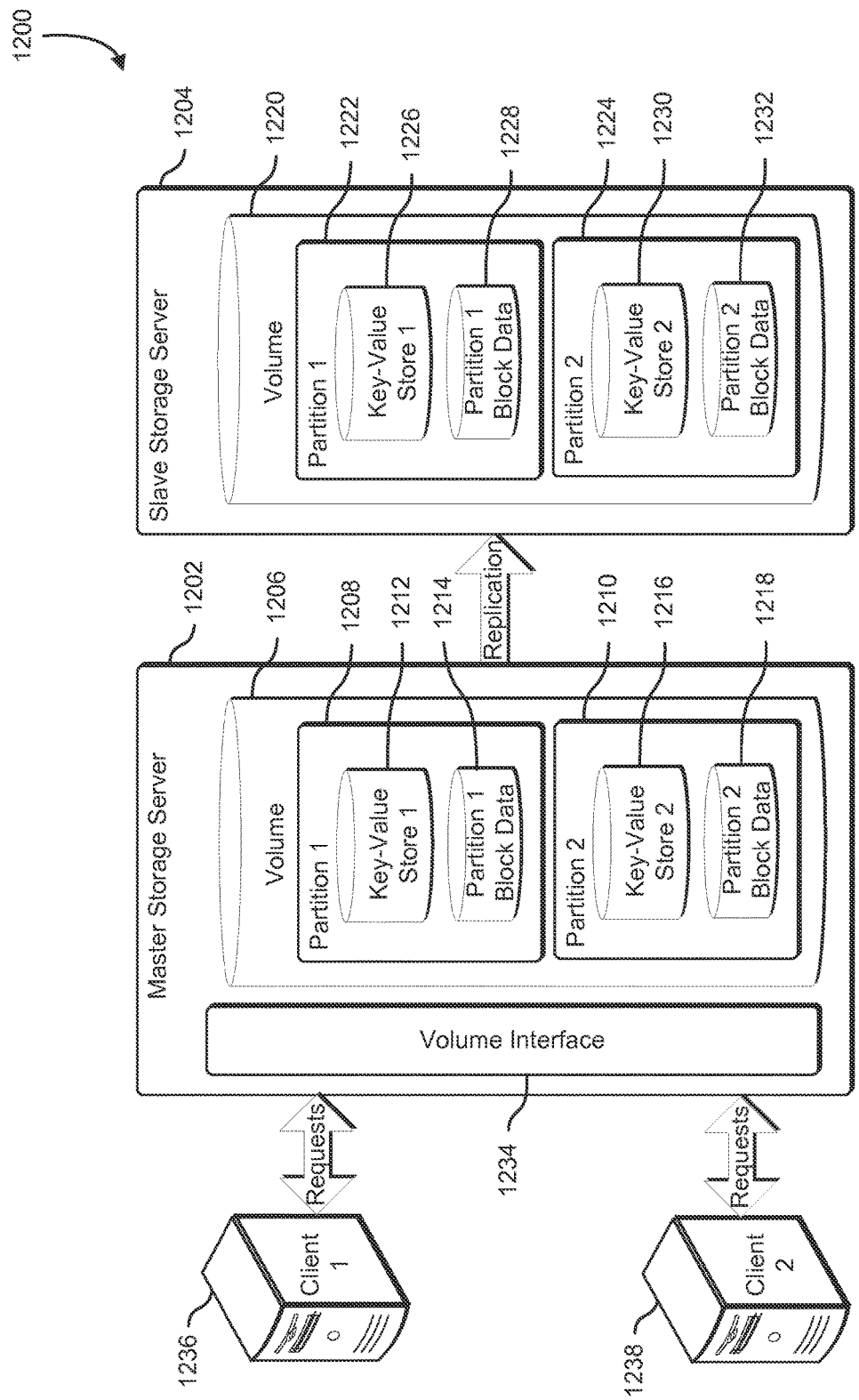
FIG. 12 shows an illustrative example of a storage system with block-data and key-value interfaces in a multi-partition configuration, in accordance with an embodiment.

FIG. 12 shows an illustrative example of a storage system with block-data and key-value interfaces in a multi-partition configuration, in accordance with an embodiment. A diagram 1200 illustrates a master storage server 1202 and a slave storage server 1204. The master storage server 1202 provides a volume 1206 that is divided into two partitions. Each partition of the two partitions represents a non-overlapping portion of the volume 1206, and each partition of the two partitions is separately attachable, addressable, and modifiable by clients. The volume 1206 includes a first partition 1208 and a second partition 1210. The first partition 1208 includes a first key-value store 1212 and a first block-data store 1214. The second partition 1210 includes a second key-value store 1216 and a second block-data store 1218. The slave storage server 1204 includes a slave volume 1220, the contents of which are replicated from the contents of the volume 1206 on the master storage server 1202. The slave volume 1220 includes a first slave partition 1222 and a second slave partition 1224. The first slave partition 1222 includes a first slave key-value store 1226 and a first slave block-data store 1228. The second slave partition 1224 includes a second slave key-value store 1230 and a second slave block-data store 1232.

A volume interface 1234 provides access to the partitions of the volume 1206 to a first client 1236 and a second client 1238. For example, in one environment the first client 1236 connects to the first key-value store 1212 located on the first partition 1208. The first client 1236 can read and write key-value records, and the key-value records will be written and read from the first key-value store 1212. The second client 1238 may simultaneously connect to the second key-value store 1216. The second client 1238 can read and write key-value records, and the key-value record to be written and read from the second key-value store 1216.

In some environments, the first client 1236 and the second client 1238 connects to the same partition. In one example, the first client 1236 connects to the first key-value store 1212. The second client 1238 also connects to the first key-value store 1212. First client 1236 and the second client 1238 perform read and write operations to and from the first key-value store 1212, and may access the same key-value records. Potential conflicts can be resolved using process locks such as semaphores, multiprocess locking software algorithms, hardware synchronization instructions, compare and swap operations supported by the volume interface 1234, or other synchronization mechanisms.

In some embodiments, throttling parameters stored in different partitions on a single volume are synchronized by a client that connects to more than one partition so that each partition of the more than one partition contains up-to-date throttling parameters that are associated with the volume.

In some implementations, a volume can be expanded or migrated by adding additional partitions to the volume or by moving the volume to another larger volume. If a volume is expanded by adding an additional partition, the key-value store is copied to the new partition and key-value write operations are replicated to all partitions on the volume including the new partition. In this way, copies of the key-value store are maintained on each partition, and if partitions are removed, the key-value store is maintained in-tact on the volume. If a volume is expanded by moving the volume to another larger volume, the key-value store is copied to the larger volume and replaces the previous key-value store.

Figure 13:
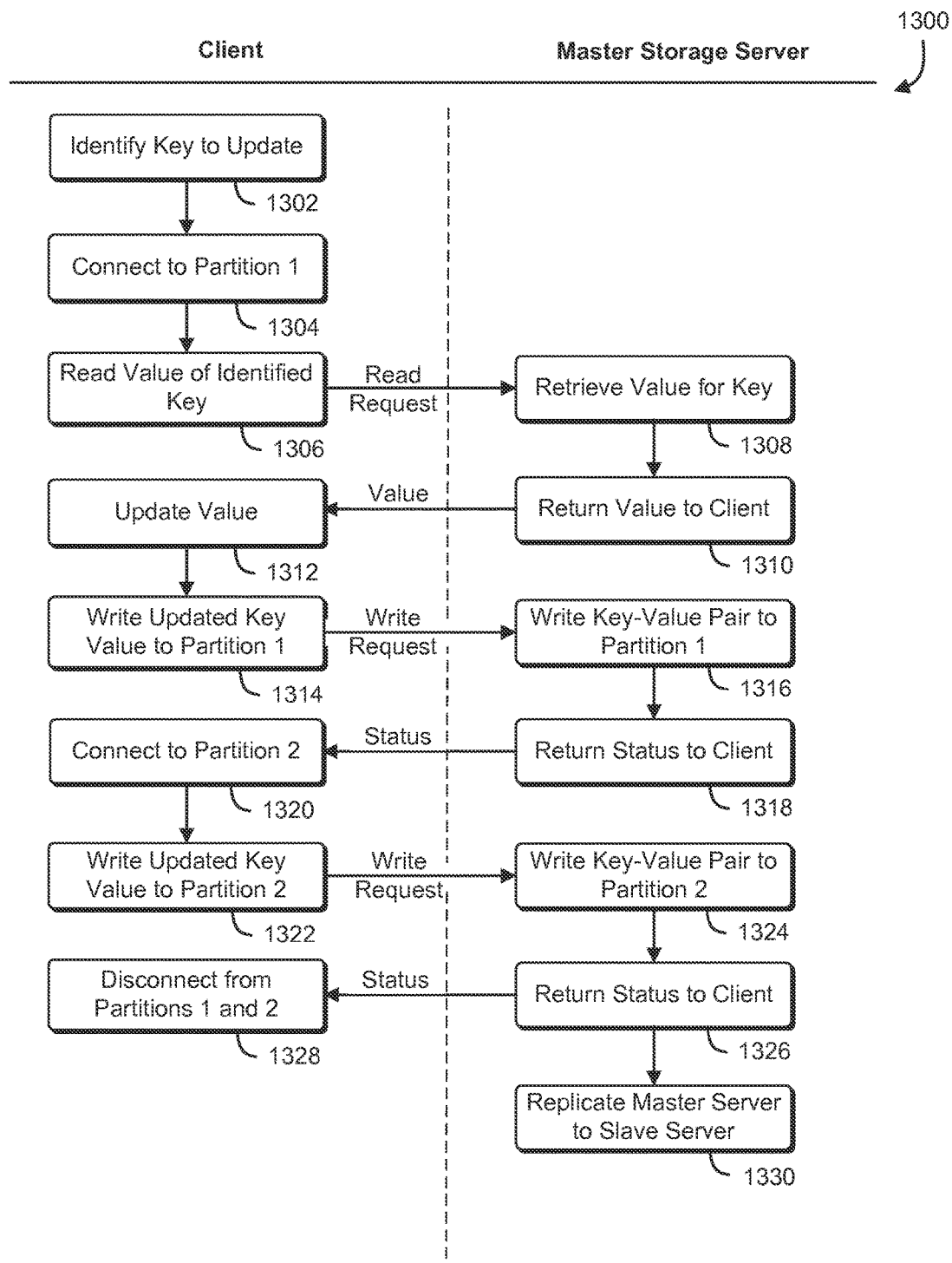
FIG. 13 shows an illustrative example of a process that, when performed by a client and a storage system, updates a key-value pair in a multi-partition environment, in accordance with an embodiment.

FIG. 13 shows an illustrative example of a process that, when performed by a client and a storage system, updates a key-value pair in a multi-partition environment, in accordance with an embodiment. In a multi-partition environment, key-value records can be synchronized by reading key-value records from one partition and writing key-value records to a number of partitions. A swim diagram 1300 illustrates a process performed by a client and a master storage server. At block 1302, the client identifies a particular key to be synchronized across two partitions. The client connects 1304 to a first partition via an interface provided by the master storage server. A read request is assembled by the client that specifies a particular key, and the request is sent 1306 to the master storage server. At block 1308, the master storage server receives the read request and retrieves the value associated with the particular key from a key-value store. The master storage server returns 1310 the retrieved value to the client.

At block 1312, the client updates the received value. The updated value is written to a plurality of partitions on the master storage server. At block 1314, the client generates a write request with the particular key and the updated value for the first partition, and sends the request to the master storage server. At block 1316, the master storage server receives the write request and writes the updated key-value record to the key-value store. At block 1318, the master storage server returns a status of the operation to the client. The client connects 1320 to a second partition on the master storage server, and generates a write request for the particular key and the updated value for the second partition. The client sends 1322 the request to the master storage server. Master storage server receives 1324 the write request and updates the key-value record on the second partition. At block 1326, the master storage server returns a status to the client. The client receives 1328 the status and disconnects from the first partition and the second partition. At block 1330, the master storage server replicates data from the key-value store on the master storage server to the key-value store on a slave storage server.

In some embodiments, a process on the storage server replicates key-value records across multiple partitions of the volume on the storage server. In such embodiments, key-value records are copied between partitions without intervention from a client. In one example, a client attaches to a particular partition of a volume on the storage server and writes a key-value record to a key-value store on the volume, and a synchronization process on the storage server is triggered. The synchronization process reads a key-value record that was written by the client, connects to another partition on the volume, and writes the key-value record that was written by the client to the other partition. In some implementations, the synchronization process replicates the key-value record to each partition on the volume.

In another embodiment, a key-value store is maintained on a separate partition on a volume. As a client connects to any partition on the volume, and performs a key-value operation, the operation is directed to the separate partition and operates on the key-value store. In this way, a single key-value store is maintained for the volume, and the synchronization of key-value records across partitions may be omitted.

Figure 14:
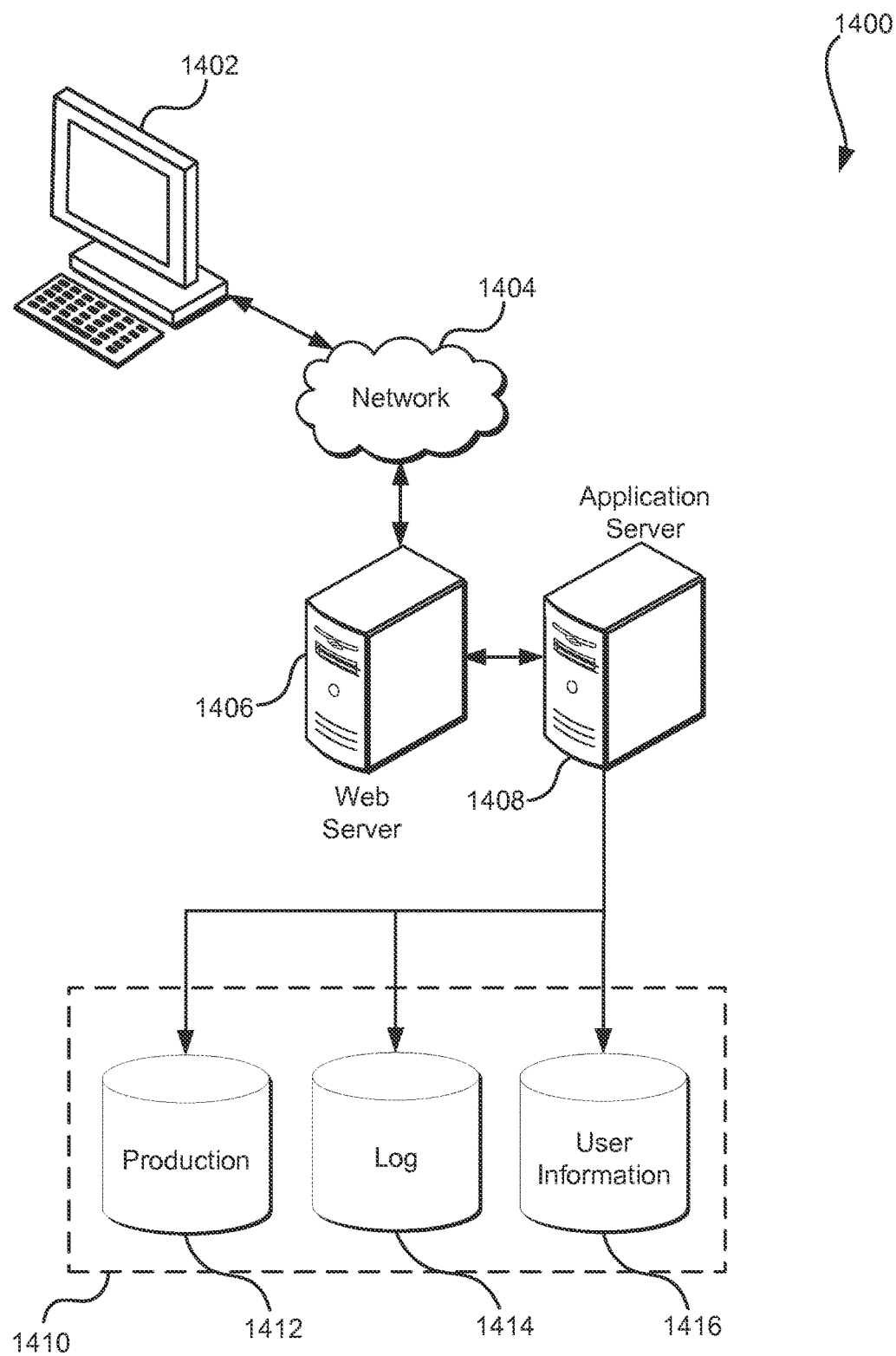
FIG. 14 illustrates an environment in which various embodiments can be implemented.

FIG. 14 illustrates aspects of an example environment 1400 for implementing aspects in accordance with various embodiments. As will be appreciated, although a web-based environment is used for purposes of explanation, different environments may be used, as appropriate, to implement various embodiments. The environment includes an electronic client device 1402, which can include any appropriate device operable to send and/or receive requests, messages, or information over an appropriate network 1404 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part on the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1402 and the application server 1408, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1410 can include several separate data tables, databases, data documents, dynamic data storage schemes and/or other data storage mechanisms and media for storing data relating to a particular aspect of the present disclosure. For example, the data store illustrated may include mechanisms for storing production data 1412 and user information 1416, which can be used to serve content for the production side. The data store also is shown to include a mechanism for storing log data 1414, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. The application server 1408 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1402. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the example environment 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
providing a storage volume on a storage server, the storage volume including a block-data store and a key-value store, the block-data store accessible via a block-data interface that supports block-data operations, the key-value store accessible via a key-value interface that supports key-value operations, the key-value store holding input/output throttling information associated with the storage volume, and the key-value store holding throttling parameters associated with the storage volume that include a burst-bucket key-value record that includes a burst-bucket value and a timestamp value that is updated with a current time when the burst-bucket value is updated;
receiving, from a client via the key-value interface, a request to perform a key value operation on the key-value store;
performing the key-value operation on the key-value store;

receiving, from a client via the block-data interface, a request to perform a block-data operation on the block-data store; and performing the block-data operation on the block-data store.

2. The computer-implemented method of claim 1, wherein the key-value store contains a number of key-value records that are stored in a B-tree that is ordered based at least in part on the key of each key-value record of the number of key-value records.

3. The computer-implemented method of claim 1, wherein the supported key-value operations include a read operation, a write operation, a list operation, and a delete operation.

4. A storage system, comprising:
a storage volume containing a key-value store and a block-data store, the key-value store holding input/output throttling information associated with the storage volume, and the key-value store holding throttling parameters associated with the storage volume that include a burst-bucket key-value record that includes a burst-bucket value and a timestamp value that is updated with a current time when the burst-bucket value is updated;
a volume interface configured to process requests specifying key-value operations and requests specifying block-data operations; and
one or more processors coupled to a non-transitory computer readable storage medium containing instructions that, when executed by the one or more processors, cause the system to implement one or more interfaces and, as part of implementing the one or more interfaces:
receive the request from a client via the volume interface, the received request specifying a key-value operation or a block-data operation; and
process the request.

5. The system of claim 4, wherein the key-value store and the block-data store on the storage volume are replicated to a slave storage volume containing a slave key-value store and a slave block-data store.

6. The system of claim 4, wherein the volume interface is configured to receive and process a request to perform a compare-and-swap operation.

7. The system of claim 4, wherein the volume interface is configured to receive and process a request to perform a list operation.

8. The system of claim 4, wherein: the volume includes a plurality of partitions; and the partitions include a copy of the key-value store.

9. The system of claim 4, wherein the volume interface is configured to receive and process a request to perform key-value read, key-value write, key-value list, and key value delete operations.

10. The system of claim 4, wherein the key-value store retains key-value records associated with client-based throttling.

11. The system of claim 4, wherein the volume interface is configured to receive and process a request to perform block-data read and block-data write operations.

12. A non-transitory computer-readable storage medium having stored thereon executable instructions that, if executed by one or more processors of a computer system, cause the computer system to at least:
receive, from a client via a key-value interface on a storage server, a request to perform a key-value operation on a key-value store, the storage server including a volume being accessible to the client via a block-data interface configured to receive requests to process requests, from the client, to perform block-data operations, the key-value store holding input/output throttling information associated with the volume, and the key-value store holding throttling parameters associated with the storage volume that include a burst-bucket key-value record that includes a burst-bucket value and a timestamp value that is updated with a current time when the burst-bucket value is updated; and
perform the key-value operation on the key-value store as part of processing the request.

13. The non-transitory computer-readable storage medium of claim 12, wherein the key-value store is implemented using a hash table.

14. The non-transitory computer-readable storage medium of claim 12, wherein: the key-value operation is a list operation with a prefix parameter; and the instructions that cause the computer system to perform the key-value operation on the key-value store, when executed by the one or more processors, causes the computer system to provide, to the client, keys that are contained in the key-value store.

15. The non-transitory computer-readable storage medium of claim 12, wherein: the volume includes a plurality of partitions distributed among a plurality of physical storage devices; and the partitions include a key-value store accessible via the key-value interface.

16. The non-transitory computer-readable storage medium of claim 12, wherein the request to perform the key-value operation on the key-value store is received at the key-value interface.

17. The non-transitory computer-readable storage medium of claim 12, wherein the key-value operation is a compare-and-swap operation.

* * * * *